United States Patent [19]

Kaplan et al.

[11] 3,893,127

[45] July 1, 1975

[54] ELECTRON BEAM RECORDING MEDIA

[75] Inventors: Michael Kaplan, Princeton; Edmund Benjamin Davidson, Short Hills, both of N.J.

[73] Assignee: RCA Corporation, New York, N.Y.

[22] Filed: Sept. 27, 1973

[21] Appl. No.: 401,213

[52] U.S. Cl. ................ 346/1; 96/115 R; 117/93.31; 204/159.11; 204/159.14; 260/79.3 A

[51] Int. Cl. .............................................. G01d 15/34

[58] Field of Search ........................ 346/1, 135, 110; 117/93.31, 93.3, 218, 8, 161 UZ; 260/79.3 A, 79.3 R; 96/115 R; 204/159.18, 159.14

[56] References Cited

UNITED STATES PATENTS

| | | | |
|---|---|---|---|
| 2,637,664 | 5/1953 | Howe | 117/161 UZ |
| 3,336,596 | 8/1967 | Dubbe et al. | 117/218 X |
| 3,535,137 | 10/1970 | Haller et al. | 117/8 |
| 3,779,806 | 12/1973 | Gipstein et al. | 117/93.31 X |

OTHER PUBLICATIONS

Bowden et al., Evaluation of Poly(Butene-1-Sulfone) as a Positive Electron Beam Resist; Am Chem Soc, Div Org Coatings Plast Chem, Prepr V33 Ni, Pap for 165th Meet, Dallas, Tex, Apr. 8–13 1973, pp. 365–371.

*Primary Examiner*—Joseph W. Hartary
*Attorney, Agent, or Firm*—Glenn H. Bruestle; Birgit E. Morris

[57] ABSTRACT

Electron beam recording media comprise a film of an olefin-$SO_2$ copolymer on a support. Certain of these copolymers give direct print-out relief patterns after exposure to electron beams.

16 Claims, No Drawings

ELECTRON BEAM RECORDING MEDIA

This invention relates to novel electron beam recording media. More particularly, this invention relates to recording media for recording information with electron beams, which media have excellent resolution and high sensitivity.

BACKGROUND OF THE INVENTION

Photoresists, which are recording media sensitive to light, are well known. Such media, when exposed to a light pattern, change their solubility characteristics in those areas struck by the light. When contacted with a suitable solvent after exposure, the more soluble portions dissolve, leaving the less soluble portions in the form of a relief pattern. Negative photoresists are initially soluble in the developer and the exposed portions become less soluble. Positive photoresists are initially insoluble in the developer and the exposed portions become more soluble.

Recently, suitably modulated electron beams have also been utilized for recording relief patterns. Electron beams, because they can be more highly focused, can record information at higher resolution or density than can light beams. While some photoresists are suitable as electron beam resists as well, most of them are relatively insensitive to electron beams. Thus recording must be performed at slow electron beam sweep rates, much slower than rates obtainable using presently available equipment. Improved materials which have a high electron beam sensitivity and are capable of providing well resolved relief patterns would be highly desirable.

SUMMARY OF THE INVENTION

We have found that certain copolymer films of $SO_2$ and olefins are excellent electron beam resists, having high sensitivity. Films of these copolymers on suitable supports provide improved electron beam recording media. Some of these polymers do not require solvent development.

DETAILED DESCRIPTION OF THE INVENTION

The polymers found useful as electron beam resists are copolymers of hydrocarbons having olefinic unsaturation and $SO_2$. These polymers are known and are characterized by an $—SO_2—C—$ linkage. The copolymers can be readily prepared in known manner as follows: $SO_2$ is condensed in a liquid nitrogen bath and transferred to a suitable reaction tube. A free radical initiator in an effective amount is added to the liquified $SO_2$, the comonomer is added, and the reaction tube is sealed. Polymerization is effected by exposing the tube to UV light, as from a mercury lamp, at temperatures of from about −10° to about −60°C. for a period of from about 30 minutes to about 10 hours. In preparing the copolymer, an excess of up to about 4 mols of $SO_2$ per mol of comonomer can be employed.

Comonomers suitable for preparing the electron beam resists described herein form film-forming, soluble polymers, and include straight chain olefins such as butene-1, butene-2, dodecene-1 and the like; branched-chain olefins such as 2-methyl-1-pentene and the like; cycloaliphatic olefins such as cyclopentene, cyclohexene and the like; aryl-substituted olefins such as allyl benzene and the like, olefins substituted with groups such as hydroxyl groups including 2-butene-1-ol, 1-propene-3-ol, bicyclo[2.2.1]hepta-2-ene-5-methanol, allyl glycidyl ether and the like; and heterocyclic unsaturated compounds such as 2-isopropenylthiophene and the like. Compounds having vinyl unsaturation are preferred.

Free radical initiators suitable for the polymerization are well known and include peroxides such as lauroyl peroxide, benzoyl peroxide, t-butyl perbenzoate, t-butyl peracetate, t-butyl hydroperoxide and the like and azo initiators such as azobisisobutyronitrile and the like. Typically the initiators are added in amounts of from about 0.1 to 0.3 gram per mol of comonomer.

The polymer can be purified by precipitation from an alcohol, such as methanol, ethanol, isopropanol, butanol and the like and reprecipitation by dissolving in a suitable solvent, such as methyl ethyl ketone, chloroform, ethyl acetate and the like, adding a nonsolvent and drying to remove the solvent.

In preparing the recording media of the invention, the purified polymer is solution cast or spun onto the desired support. The nature of the support is conventional; suitable supports can be flexible, such as polyester tape, or inflexible, such as glass plate; transparent or opaque; depending on the nature of the recording system in which it is to be employed. The concentration of the polymer in the solvent, which can be for example dimethylformamide or toluene, is adjusted so as to deposit a film of the desired thickness onto the support. The solvent is then removed in any conventional manner, as by drying, evaporating and the like.

An electrically conductive layer is also required to remove the charge after electron beam exposure. In the event that the support is nonconducting, a thin conductive film is applied either to the support prior to coating with the resist, or, applied onto the surface of the prepared recording media. This conductive film can be conductive-coated glass, such as tin oxide or indium oxide coated glass, glass having a conductive metal film thereon and the like. Alternatively an electron permeable conductive layer can be formed on the polymer film by vapor deposition of a thin film of copper, nickel, aluminum, chromium or other conductive metal or alloy in known manner. The conductive layer is suitably from about 50–10,000, preferably 100–1000 angstroms in thickness.

The recording media comprising the copolymer film on a support is ready for exposure to electron beam recording. A variable speed scanning electron microscope is employed in known manner to record the desired information in the copolymer film. Although the exact mechanism of recording is not known, it is believed the electron beam "unzips" or degrades the $SO_2—C$ linkage. This changes the solubility characteristics of the polymer so that for positive-acting polymers, contact with a solvent dissolves the exposed portions of the film more rapidly than the unexposed portions. In some cases, the degradation results in the formation of volatile byproducts which evaporate, in which case no solvent development is required. Such vapor phase or direct print-out resists are of special interest since the solvent development step can be eliminated.

Although the term electron beams has been used throughout the present specification, this term is meant to include beams of charged particles having very high energy and electromagnetic radiation, also including x-rays, $\gamma$-rays and the like.

When required, the recording medium is developed after exposure by immersing in or spraying with a suitable solvent or a solvent mixture containing a solvent and a nonsolvent. Very fast working solvents are preferably diluted with a nonsolvent to decrease the rate of solution and avoid undue dissolution of the nonexposed portions of the resist. The solvent-nonsolvent combination employed for each copolymer is generally determined empirically and is usually not critical. The time required for development or dissolution of exposed polymer is not critical and can vary up to about 30 minutes, depending on the polymer, solvent and nonsolvent employed and the depth of the relief pattern desired. In general, copolymer films about 350 millimicrons thick are deposited on the support and development is carried out until about 50 millimicrons of the unexposed copolymer layer are dissolved. At this point, the exposed portions of a sensitive resist will have dissolved through to the substrate. Optimum solvent mixtures and development time for each copolymer that will give the best combination of relative solubility of exposed and nonexposed portions can be readily determined by a series of test runs by one skilled in the art.

The invention will be further illustrated by the following examples, but it is to be understood that the invention is not meant to be limited to the details described therein.

EXAMPLE I

A series of $SO_2$-olefin copolymers were prepared by adding about one mol of the olefin to about one mol of cold, liquified $SO_2$ containing about 0.1 gram of azobisisobutyronitrile and exposing to a 200 watt mercury lamp for about 4 hours at a temperature below −10°C. The polymers were precipitated from methanol.

The purified polymer was dissolved in a solvent to make a 2–6 percent by weight solution and spun onto ½ × ½ inch glass plates coated with a 200 angstrom thick layer of chromium and a 2000 angstrom thick layer of nickel. The films were exposed to the beam of a scanning electron microscope at an accelerating potential of 5kV and a beam current of 3nA. An approximately Gaussian shaped beam having a full width at half amplitude of about 0.5 micron was scanned to describe rasters on the surface of the films at various speeds, thereby varying the total exposure of the films to the beam.

The samples were developed in various solutions as set forth below by immersing the exposed film for about up to 30 seconds.

A. COMONOMER DODECENE-1

This copolymer was applied to the substrate from a 3% by weight solution in toluene. Direct print-out rasters were observed at very fast scan speeds, up to 3400 cm/sec., although no direct print-out trough went through to the substrate.

When the trough obtained by scanning at 50 cm/sec. was developed in acetone for 30 seconds, the trough width was 0.8 micron and was through to the substrate.

B. COMONOMER 2-METHYLPENTENE-1

This copolymer was applied to the substrate from a 5% by weight solution in chlorobenzene. Direct print-out rasters were observed at scan speeds up to 125 cm/sec. which were through to the substrate and were about 0.5 micron wide.

C. COMONOMER BUTENE-2

This copolymer was applied to the substrate from a 5% by weight solution in chloroform. Only weak direct print-out rasters were observed, but sharp walled troughs 1.1 microns wide and through to the substrate were obtained by scanning at speeds up to about 125 cm/sec. and developing in a 3:2 by volume mixture of chloroform and isopropanol for 12 seconds. Development using methyl ethyl ketone and acetone admixed with alcohol were also successful.

EXAMPLE II

Additional olefin-$SO_2$ copolymer films were prepared and exposed to a scanning electron microscope as in example I. The following Table summarizes the comonomers employed, development solvent employed and direct print-out relief patterns observed, if any.

TABLE

| Comonomer | Direct Print-Out Patterns | Developer Solvents | Developed Patterns |
|---|---|---|---|
| 2-butene-1-ol | moderate | isopropanol | poor |
| cyclohexene | moderate | methyl ethyl ketone<br>acetone<br>diisobutyl ketone | good |
| butene-1 | moderate | cyclohexanone<br>tetrachloroethane | moderate |
| 2-isopropenylthiophene | none | hexane | poor |
| bicyclo[2.2.1]hepta-2-ene-5-methanol | weak | dimethylformamide<br>acetonitrile | poor |
| cyclopentene | none | acetone<br>methyl ethyl ketone<br>diisobutyl ketone | good |
| allyl alcohol (1-propene-3-ol) | none | cyclohexanone | good |
| allyl benzene | none | methyl ethyl ketone/methanol<br>2-methoxyethyl acetate/isopropanol | poor |
| allyl glycidyl ether | none | acetone/methanol | poor* |

*negative-working

1. In a method of recording information whereby a modulated beam of electrons is scanned across the surface of a resist material which becomes more soluble in the developer solvent when impinged upon by the beam of electrons and the resist material is developed with a developer solvent so as to remove the solubilized portions thereof, the improvement which comprises employing as the resist material a film of a copolymer of $SO_2$ and an olefin.

2. A method of recording information in the form of a surface relief pattern in a recording medium which comprises scanning a modulated, information-containing beam of electrons across the surface of a resist material which comprises a film of a copolymer of $SO_2$ and an olefin on a support.

3. A method according to claim 2 wherein the olefin is 2-methylpentene-1.

4. A method of recording information in the form of a surface relief pattern in a recording medium which comprises a. scanning a modulated information-containing beam of electrons across the surface of a resist material which comprises a film of a copolymer of $SO_2$ and an olefin on a support, and b. exposing the film to a developer solution to dissolve the portions of the resist film exposed to the electron beam.

5. A method according to claim 4 wherein the film is about 350 millimicrons in thickness.

6. A method according to claim 5 wherein the exposure step is continued until about 50 millimicrons of the unexposed resist film has dissolved.

7. An information storage medium which comprises a support and an electron beam sensitive film thereon, said film comprising a copolymer of $SO_2$ and an olefin having information in the form of a surface relief pattern in an electron beam exposed surface.

8. A medium according to claim 7 wherein the comonmer has vinyl unsaturation.

9. A medium according to claim 7 wherein the support has a conductive film thereon.

10. A medium according to claim 7 wherein the medium has a conductive layer on the electron beam sensitive film.

11. A medium according to claim 7 wherein the olefin is 2-methylpentene-1.

12. A medium according to claim 7 wherein the olefin is dodecene-1.

13. A medium according to claim 7 wherein the olefin is butene-2.

14. A medium according to claim 7 wherein the olefin is cyclopentene.

15. A medium according to claim 7 wherein the olefin is allyl alcohol.

16. A medium according to claim 7 wherein the olefin is cyclohexene.

* * * * *

UNITED STATES PATENT AND TRADEMARK OFFICE

Certificate

Patent No. 3,893,127 Patented July 1, 1975

Michael Kaplan and Edmund Benjamin Davidson

Application having been made by Michael Kaplan and Edmund Benjamin Davidson, the inventors named in the patent above identified, for the issuance of a certificate under the provisions of Title 35, Section 256, of the United States Code, deleting the name of Edmund Benjamin Davidson as a joint inventor, and a showing and proof of facts satisfying the requirements of the said section having been submitted, it is this 7th day of July 1981, certified that the name of the said Edmund Benjamin Davidson is hereby deleted from the said patent as a joint inventor with the said Michael Kaplan.

Fred W. Sherling
*Associate Solicitor.*

Dedication 3,893,127.—*Michael Kaplan,* Princeton, N.J. ELECTRON BEAM RECORDING MEDIA. Patent dated July 1, 1975. Dedication filed Mar. 7, 1986, by the assignee, *RCA Corp.*

Hereby dedicates to the Public the remaining term of said patent.

[*Official Gazette August 5, 1986.*]